United States Patent [19]

Boutni et al.

[11] 4,397,982
[45] Aug. 9, 1983

[54] COMPOSITIONS

[75] Inventors: Omar M. Boutni, Mt. Vernon, Ind.; Ping Y. Liu, Naperville, Ill.

[73] Assignee: General Electric Company, Mt. Vernon, Ind.

[21] Appl. No.: 316,671

[22] Filed: Oct. 30, 1981

[51] Int. Cl.³ .................................................. C08K 3/34
[52] U.S. Cl. .................................. 524/493; 524/423; 524/435; 524/441; 524/447; 524/448; 524/452; 524/495; 524/504; 525/67; 525/68
[58] Field of Search ............... 525/67, 68; 524/508, 524/570, 493, 504, 423, 435, 441, 447, 448, 452, 495

[56] References Cited

U.S. PATENT DOCUMENTS

| | | | |
|---|---|---|---|
| 3,431,224 | 3/1969 | Goldbaum | 525/148 |
| 3,655,824 | 4/1972 | Kato et al. | 525/67 |
| 3,936,400 | 2/1976 | Wambach | 525/146 |
| 4,136,082 | 1/1979 | Brady | 260/42.45 |
| 4,138,534 | 2/1979 | Tedesco | 260/42.45 |
| 4,245,058 | 1/1981 | Liu | 525/148 |
| 4,260,693 | 4/1981 | Liu | 525/148 |
| 4,263,415 | 4/1981 | Liu | 525/148 |
| 4,299,928 | 11/1981 | Witman | 525/67 |

OTHER PUBLICATIONS

European Pat. Appl. 4,645; Oct. 17, 1979.
Research Disclosure, Aug. 1981, 20810.

Primary Examiner—J. Ziegler
Attorney, Agent, or Firm—Martin B. Barancik

[57] ABSTRACT

Novel thermoplastic molding compositions of a polycarbonate, a linear low density polyolefin, a multiphase composite interpolymer of an acrylate and a methacrylate are disclosed which have good impact strengths and reprocessability.

16 Claims, No Drawings

COMPOSITIONS

BACKGROUND OF THE INVENTION

Polycarbonate resins have high impact resistance with ductility to notch or crack propagation at an average of up to about 0.2 inches thickness when the incident notch is 10 mils (thousandths) of an inch in radius. Above this average thickness the impact resistance and ductility of polycarbonate resins decline. This phenomena is commonly found in glassy plastics and is referred to as the critical thickness for notched impact resistance of a glassy plastic.

Additionally, the impact strength of notched polycarbonate resins decreases as temperatures decrease below about −5° C. and also after aging the polymers at elevated temperatures above about 100° C. These temperatures are commonly found in applications where extremes of heat and cold are to be expected.

Thus, it is desirable to use a composition which extends the impact strength and ductility of polycarbonate resins to variable thickness parts or articles of use which resist embrittlement upon exposure to high or low temperatures in a notched or scratched condition.

Compositions are known which extend the high impact resistance and ductility characteristics of polycarbonate resins to parts beyond the critical thickness and under low and high temperature aging conditions, but many of these compositions suffer from incompatabilities of the polymeric components which results in poor weld-line and knit line strengths of fabricated parts as evidenced by low double-gate impact strengths when measured according to ASTM D256.

It has been found that a composition of a polycarbonate resin, a linear low density polyolefin and a multiphase composite interpolymer of an acrylate and a methacrylate has superior impact properties at temperatures as low as about −30° C. In addition, the compositions of this invention also have good weld line strengths as measured in accordance with ASTM D256, lowered melt viscosities and improved heat stability as compared to unmodified polycarbonate compositions. Furthermore, the compositions of the invention have a wider shear sensitivity, improved hydrolytic stability and enhanced chemical resistance.

Compositions according to the present invention have improved reprocessability which is of significant importance in reducing or eliminating losses due to scrap materials that cannot be re-extruded without loss of properties.

It has also been found that the low temperature impact strength of a composition of a polycarbonate, a multiphase interpolymer and a linear low density polyethylene is affected by the amount of the multiphase interpolymer and the amount of the linear low density polyethylene that are present in the composition. When levels of the linear low density polyethylene are below about 6.0 parts per hundred parts by weight of total composition (phr) it is desirable to employ about 4.0 phr of the multiphase composite interpolymer to achieve fully ductile low temperature impact strengths because when less than about 4.0 phr of the multiphase composite interpolymer are employed, with less than about 6.0 phr of the linear low density polyethylene, the test samples are brittle. If about 4.0 phr of the multiphase composite interpolymer is present in the composition, then the amount of linear low density polyethylene may be reduced to about 2.0 phr without adversely affecting the ductile impact strength.

It is to be understood that the invention is not limited to the polycarbonate compositions which have the optimum ductile impact strengths which are achieved by selection of the minimum effective amounts of the multiphase composite interpolymer and the linear low density polyethylene.

The especially preferred compositions of the invention will have a low temperature impact strength in excess of about 10.0 ft.lb/inch at −29° C. as measured according to ASTM D256.

DETAILED DESCRIPTION OF THE INVENTION

The composition of the invention comprises:
(a) a high molecular weight polycarbonate resin
(b) a multiphase composite interpolymer which comprises a $C_{1-5}$ acrylate and a $C_{1-5}$ methacrylate; and
(c) a linear low density polyolefin.

The polycarbonate resin may be of the formula:

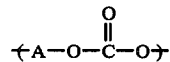

wherein A is a divalent aromatic radical. Preferred polycarbonate resins are of the formula:

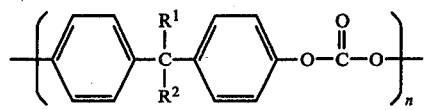

wherein $R^1$ and $R^2$ are hydrogen, (lower) alkyl or phenyl and n is at least 30 or preferably 40–400. The term (lower) alkyl includes hydrocarbon groups of from 1–6 carbon atoms.

High molecular weight, thermoplastic, aromatic polycarbonates in the sense of the present invention are to be understood as homopolycarbonates and copolycarbonates and mixtures thereof which have a number average molecular weight of about 8,000 to more than 200,000, preferably of about 10,000 to 80,000 and I.V. of 0.30 to 1.0 dl/g as measured in methylene chloride at 25° C. These polycarbonates are derived from dihydric phenols such as, for example, 2,2-bis(4-hydroxyphenyl)-propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4-4'-dihydroxydiphenyl)propane, and (3,3'-dichloro-4,4'-dihydroxydiphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436 or by transesterification processes such as are disclosed in U.S. Pat. No. 3,153,008, as well as other processes known to those skilled in the art.

The aromatic polycarbonates utilized in the present invention also include the polymeric derivatives of a dihydric phenol, a dicarboxylic acid, and carbonic acid, such as disclosed in U.S. Pat. No. 3,169,121.

It is also possible to employ two or more different dihydric phenols or a copolymer of a dihydric phenol with a glycol or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can be utilized in the practice of this invention, as can blends of a linear polycarbonate and a branched polycarbonate.

The linear low density polyolefins that may be utilized in the practice of the invention are well known materials which are exemplified by linear low density polyethylene (LDPE). These polymers may be prepared from state of the art polymerization processes such as those described in U.S. Pat. No. 4,076,698 and Eur. Pat. Appl. 4,645, both of which are incorporated by reference. These polymers have a density between about 0.89 and about 0.96 gms/cc and a controlled concentration of simple side chain branching which distinguishes them from polymers such as high pressure low density polyethylene and high density polyethylene made from a Ziegler catalyst system. The preferred range of density is from 0.915 to 0.945 gms/cc. The LLDPE polymers are actually copolymers of ethylene with one or more alpha olefins of $C_3$ to $C_{18}$, preferably $C_3$ to $C_{10}$, and more preferably $C_4$ to $C_8$. The alpha olefins should not contain any branching in any of their carbons which is closer than the fourth carbon atom to the terminal carbon atom participating in the unsaturation.

The preferred LLDPE copolymers may be made from ethylene and one or more alpha olefins selected from the group consisting of propylene, butene-1, heptene-1, 4-methyl pentene-1 and octene. These preferred copolymers have a melt flow ratio of $\geq 22$ to $\leq 32$ and preferably $\geq 25$ to $\leq 30$. The melt flow ratio of these preferred copolymers is another means of indicating the molecular weight distribution of a polymer. The melt flow ratio (MFR) range is $\geq 22$ to $\leq 32$ thus corresponds to a Mw/Mn value of about 2.7 to 4.1 and the MFR range of $\geq 25$ to $\leq 30$ corresponds to a Mw/Mn range of 2.8 to 3.6.

The especially preferred (LLDPE) copolymers have a density of between about 0.915 and 0.945. The density of the copolymer, at a given melt index level for the copolymer, is primarily regulated by the amount of the comonomer which is copolymerized with the ethylene. The addition of increasing amounts of the comonomers to the copolymers results in a lowering of the density of the copolymer.

The preferred copolymers have an unsaturated group content of $\leq 1$ and preferably $\geq 0.1$ to $\leq 0.3$, C=C/1000 carbon atoms and a n-hexane extractables content (at 50° C.) of less than about 3 and preferably less than 2 weight percent which is described in Chem. Eng., December 3, 1979, pp. 80–85 which is incorporated by reference.

The multiphase composite interpolymers which comprise a $C_{1-5}$ acrylate and a $C_{1-5}$ methacrylate are described in U.S. Pat. No. 4,260,693 and in U.S. Pat. No. 4,096,202 both of which are incorporated by reference.

These interpolymers consist of about 25 to 95 weight percent of a first elastomeric phase polymerized from a monomer system comprising about 75 to 99.8 percent by weight of a $C_{1-5}$ alkyl acrylate, 0.1 to 5 percent by weight cross-linking monomer, and 0.1 to 5 percent by weight of graftlinking monomer, and about 75 to 5 weight percent of a final rigid thermoplastic phase polymerized in the presence of said elastomeric phase.

The graftlinking monomer is a polyethylenically unsaturated monomer having a plurality of addition polymerizable reactive groups, at least one of which polymerizes at a substantially different rate of polymerization from at least one of the other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized with from about 60 to 100 percent by weight methacrylate. A preferred multiphase composite interpolymer is commercially available from Rohm and Haas as Acryloid KM-330.

Generally, the compositions of the invention may comprise from about 40.0 to about 99.0 parts by weight of polycarbonate resin; from about 30.0 to about 0.5 parts by weight of linear low density polyethylene; from about 0.5 to about 30 parts by weight of the multiphase interpolymer which comprises a $C_{1-5}$ acrylate and a $C_{1-5}$ methacrylate per 100 parts by weight of polycarbonate, multiphase interpolymer and linear low density polyethylene. A preferred range comprises from about 80.0 to about 98.0 parts by weight of polycarbonate; from about 1.0 to about 10.0 parts by weight of linear low density polyethylene and 1 to 10 parts by weight of the multiphase interpolymer of a $C_{1-5}$ acrylate and a $C_{1-5}$ methacrylate per 100 parts by weight of polycarbonate, multiphase interpolymer and linear low density polyethylene. An especially preferred composition may comprise from about 92.0 to 94.0 parts by weight of polycarbonate; from about 1.0 to 3.0 parts by weight of linear low density polyethylene; and from 3.0 to 5.0 parts by weight of the multiphase composite interpolymer.

The compositions of the invention may include reinforcing fillers, such as aluminum, iron or nickel and the like and nonmetals, such as carbon filaments, silicates, such as acicular calcium silicate, acicular calcium sulfate, wollastonite, asbestos, titanium dioxide, potassium titanate, bentonite, kaolinite and titanate whiskers, glass flakes and fibers and mixtures thereof. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperatures.

Although it is only necessary to have at least a reinforcing amount of the reinforcement present, in general, the reinforcing filler may comprise from about 1 to about 60 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The filament diameters range from about 0.003 to 0.009 inch, but this is not critical to the present invention.

By glass fibers, it is understood that glass silk, as well as all glass fiber materials derived therefrom including glass fiber fabrics, rovings, stable fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic, melamine or polyvinyl alcohol. Preferably, the composition contains from about 1 to about 50 weight percent of the glass fibers.

Flame retardant amounts of flame retardants may also be utilized in the composition of the invention in amounts of from 0.5–50 parts by weight of the resinous components. Examples of suitable flame retardants may be found in U.S. Pat. Nos. 3,936,400 and 3,940,366 which are incorporated by reference. Other conventional non-reinforcing fillers, antioxidants, extrusion aids, light stabilizers and the like may be added to the composition of the invention if desired.

The manner of preparing the inventive composition is conventional. Preferably, each ingredient is added as part of a blend premix and the latter is mixed, e.g., by passage through an extruder, or by fluxing on a mill at a temperature dependent on the particular composition. The mixed composition may be cooled and cut up into molding granules and molded into the desired shape. When the compositions of the invention are molded at temperatures between about 265°–340° C. the molded articles do not splay or plate out, which is a significant advantage.

The term double gate (DG) is used in the examples to report the weld line strength of samples prepared in a double gate mold which have been tested according to ASTM D256. The superscripts for the impact data in the examples refer to the percent ductility of the samples. Where no superscript appears, the samples were 100% ductile.

DESCRIPTION OF THE PREFERRED EMBODIMENTS

The following examples are illustrative of the invention.

EXAMPLE 1

A series of compositions was prepared using commercially availabe linear low density polyethylenes. Each composition contained 2.0% by weight of the LLDPE; 4.0% by weight of a composite interpolymer comprising a weight ratio of 3:2 of n-butyl acrylate to methyl methacrylate (Acryloid KM-330); 93.84% by weight of a polycarbonate resin of 2,2-bis(4-hydroxyphenyl)propane having an intrinsic viscosity of 0.46 dl/g as measured in methylene chloride at 25° C.; 0.06% by weight of bis(2,4-di-tert-butylphenyl)pentaerythritol diphosphite; and 0.1% by weight of octadecyl 3,5-di-tert-butyl-4-hydroxyhydrocinnamate. The compositions were prepared by the conventional method of dry blending by mechanical mixing followed by extrusion at about 265° C. The extrudate was comminuted into pellets and the pellets were injection molded into test specimens that measured 5"×½"×⅛" and 5"×½"×¼". Izod impact strengths were determined in accordance with the general procedure of ASTM D256 and these values are reported below in Table 1.

The test data of Table 1 shows that the notched impact strength at −29° C., of the compositions of this invention, is significantly improved by the incorporation of the various linear low density polyethylenes as compared with the control which contains the interpolymer and polycarbonate.

TABLE 1

| | IMPACT STRENGTH | | | | |
|---|---|---|---|---|---|
| SAMPLE | ⅛" NI (ft.lb/in.notch) | ⅛" NI (AGED) (ft.lb/in notch) | ¼" NI (ft.lb/in.notch) | ⅛" NI at −29° C. (ft.lb/in.notch) | DG (ft-lb) |
| A-Control* | — | 13.3 | 12.5 | $4.0^0$ | $40.0^0$ |
| B-Dowlex 61500-0.4 | 14.5 | 12.7 | 11.3 | 10.8 | 37.6 |
| C-Escorene LPX-12 | 14.5 | 13.9 | 12.0 | $10.0^{60}$ | 40.3 |
| D-Escorene LPX-15 | 14.0 | 13.2 | 11.8 | $12.0^{80}$ | 39.0 |

*Contains 4.0 phr Acryloid KM-330; 96 phr of polycarbonate resin and no LLDPE

EXAMPLE 2

Sample E was prepared as a control composition containing no LLDPE, 4.0% by weight of the multiphase composite interpolymer used in Example 1;

0.05% by weight of a stabilizer which consisted of a mixture of 25% by weight of triphenylphosphite; 50% by weight of diphenyldecylphosphite; and 25% by weight of didecylphenylphosphite with the balance of the composition up to 100% by weight being the same polycarbonate used in Example 1. Sample F is also a control that was prepared, without any multiphase composite interpolymer but with 4.0% by weight of LLDPE; 0.6% by weight of the diphosphite of Example 1; 0.1% by weight of the cinnamate of Example 1 and the balance up to 100% being made up with the polycarbonate of Example 1.

Samples G–J contained various amounts of LLDPE; 4.0% by weight of the multiphase composite interpolymer of Example 1; 0.06% of the diphosphite of Example 1; and the balance up to 100% by weight of the polycarbonate of Example 1. The impact strengths of the test samples are reported in Table 2.

ple passes through an extruder. The number of extrusions and the impact strengths are reported in Table 4.

TABLE 4

| Number of Extrusions | 1 | 3 | 5 | 7 | 9 |
|---|---|---|---|---|---|
| Izod Impact ft/lb/in.n. | | | | | |
| .125 N.I. | 14 | 14 | 14 | 13.9 | 14 |
| .125 N.I. Aged 48 hr. at 125° C. | 13.4 | 13.3 | 13.4 | 13.4 | 13.6 |
| .250 N.I. | 12.3 | 11.4 | 11.7 | 11.7 | 11.7 |

A prior art composition which contains 95.8 parts by weight of polycarbonate; 2.0 parts by weight of a graft copolymer of methyl methacrylate on a butadiene styrene backbone (Acryloid KM-611); and 2.2 of a high density polyethylene (Petrothene LB703) cannot sustain repeated extrusions.

Obviously, other modifications and variations of the

TABLE 2

| SAMPLE | LLDPE* CONTENT (phr) | IMPACT STRENGTH | | | | |
|---|---|---|---|---|---|---|
| | | ⅛" NI (ft.lb/in.notch) | ⅛" NI (AGED) (ft.lb/in. notch) | ¼" NI (ft.lb/in. notch) | ⅛" NI at −29° C. (ft.lb/in. notch) | DG (ft-lb) |
| E** Control 1 | 0 | — | 13.3 | 12.5 | 4.0$^0$ | 40 |
| F*** Control 2 | 4 | 14.4 | 12.1 | 8.1 | 7.2$^{40}$ | 20.2 |
| G | 2 | 14.5 | 14.5 | 12.0 | 13.8 | 34.8 |
| H | 4 | 14.5 | 13.9 | 11.0 | 12.3 | 21.8 |
| I | 6 | 13.9 | 13.2 | 10.0 | 12.0 | 10.4 |
| J | 8 | 13.2 | 11.9 | 9.3 | 12.0 | 8.1 |

*Escorene LPX-12
**Control 1 with 4.0% by weight of the multiphase composite interpolymer
***Control 2 without the multiphase composite interpolymer The data in Table 2 shows that when the LLDPE and multiphase composite interpolymer impact modifiers are used at the stated levels, they effectively increase the low temperature ductility and toughness of a polycarbonate composition.

EXAMPLE 3

A series of compositions was prepared using the same components as in Example 1 except that the amount of the composite interpolymer was 2.0% by weight in each sample and the linear low density polyethylene was varied as indicated. The amount of the bis(2,4-di-tert-butylphenyl)pentaerythritol diphosphite was 0.06% by weight and the amount of octadecyl 3,5-di-tert-butyl-4-hydroxycinnamate was 0.1% by weight. The test properties are reported in Table 3.

present invention are possible in light of the above teachings. It is, therefore, to be understood that changes may be made in the particular embodiment of the invention described which are within the full intended scope of the invention as defined by the appended claims.

What is claimed is:

1. A thermoplastic molding composition which comprises:
   (a) a high molecular weight polycarbonate resin;
   (b) a multiphase composite interpolymer which comprises:
      (i) a first elastomeric phase polymerized from a $C_{1-5}$ alkyl acrylate; a crosslinking monomer; and a graft-linking monomer, said graft-linking monomer being a polyethylenically unsaturated monomer having a plurality of addition polymeriz-

TABLE 3

| SAMPLE | LLDPE* CONTENT (phr) | IMPACT STRENGTH | | | | |
|---|---|---|---|---|---|---|
| | | ⅛" NI (ft.lb/in.notch) | ⅛" NI (AGED) (ft.lb/in. notch) | ¼" NI (ft.lb/ notch) | ⅛" NI at −29° C. (ft.lb/in. notch) | DG (ft-lb) |
| K | 2.0 | 14.5 | 13.8 | 12.1 | 6.8$^0$ | 30.8 |
| L | 4.0 | 14.5 | 13.9 | 11.0 | 10.8$^{60}$ | 21.5 |
| M | 6.0 | 13.9 | 12.6 | 10.0 | 12.2 | 9.4 |
| N | 8.0 | 13.2 | 11.9 | 9.3 | 11.2 | 7.4 |

*Escorene LPX-12
Samples K and L are somewhat more brittle than samples M and N because of the fact that 2.0 phr of the multiphase composite interpolymer are present.

EXAMPLE 4

A composition was prepared which contained the same components that were included in Sample G. This composition was extruded repeatedly at about 265° C. to demonstrate that the impact strength of the reprocessed composition was not adversely affected by multiable reactive groups, at least one of which polymerizes at a substantially different rate of polymerization from at least one other of said reactive groups; and (ii) a final rigid thermoplastic phase polymerized at the surface of the elastomeric phase comprising a $C_{1-5}$ methacrylate; and (c) a linear low density polyolefin.

2. A thermoplastic molding composition as defined in claim 1 wherein the linear low density polyolefin is polyethylene.

3. A thermoplastic molding composition as defined in claim 2 wherein the linear low density polyolefin is formed from ethylene and a $C_3$ to $C_{10}$ alpha olefin in a low pressure gas phase process.

4. A thermoplastic molding composition as defined in claim 1 wherein the linear low density polyolefin is formed from ethylene and a $C_4$ to $C_8$ alpha olefin in a low pressure gas phase process.

5. A thermoplastic molding composition as defined in claim 4 wherein the polycarbonate is of the formula:

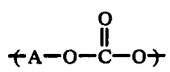

wherein A is a divalent aromatic radical of a dihydric phenol.

6. A thermoplastic molding composition as defined in claim 5 wherein the polycarbonate resin is of the formula:

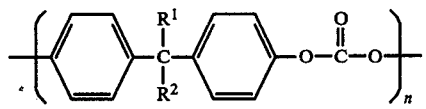

wherein $R^1$ and $R^2$ are hydrogen, (lower) alkyl or phenyl and n is at least 30.

7. A thermoplastic molding composition as defined in claim 4 wherein the linear low density polyolefin is a virgin ethylene copolymer formed from ethylene and at least one $C_4$ to $C_8$ alpha olefin, with a melt flow ratio of $\geq 22$ to $\leq 32$, and an unsaturated group content of $\leq 1$ $C=C/1000$ carbon atoms.

8. A thermoplastic molding composition as defined in claim 7 which has a low temperature notched impact strength in excess of 10.0 ft. lb/in at $-29°$ C. as measured according to ASTM D256.

9. A thermoplastic molding composition as defined in claim 7 which has a weld line strength in excess of 20 ft.lbs as measured according to ASTM D256.

10. A thermoplastic molding composition as defined in claim 4 wherein the linear low density polyolefin resin is a copolymer of ethylene and 1-butene.

11. A thermoplastic molding composition as defined in claim 10 wherein the multiphase composite interpolymer is derived from monomers which comprise methyl methacrylate and n-butyl acrylate.

12. A thermoplastic molding composition as defined in claim 1 which includes a reinforcing amount of a reinforcing filler.

13. A thermoplastic molding composition as defined in claim 12 wherein the reinforcing filler is filamentous glass.

14. A thermoplastic molding composition as defined in claim 1 which includes a flame retardant amount of a flame retardant agent.

15. A thermoplastic molding composition as defined in claim 13 which includes a flame retardant amount of a flame retardant.

16. A thermoplastic molding composition as defined in claim 1 wherein the multiphase composite interpolymer comprises a first stage derived from n-butyl acrylate and a final stage derived from methyl methacrylate and the linear low density polyolefin is formed from ethylene and 1-butene.

* * * * *